June 2, 1925.  H. P. MERTEL  1,540,490

GATE MOUNTING

Filed Feb. 7, 1924   2 Sheets-Sheet 1

INVENTOR
Henry P. Mertel
BY
Joseph F. O'Brien
His ATTORNEY

June 2, 1925. 1,540,490
H. P. MERTEL
GATE MOUNTING
Filed Feb. 7, 1924 2 Sheets-Sheet 2
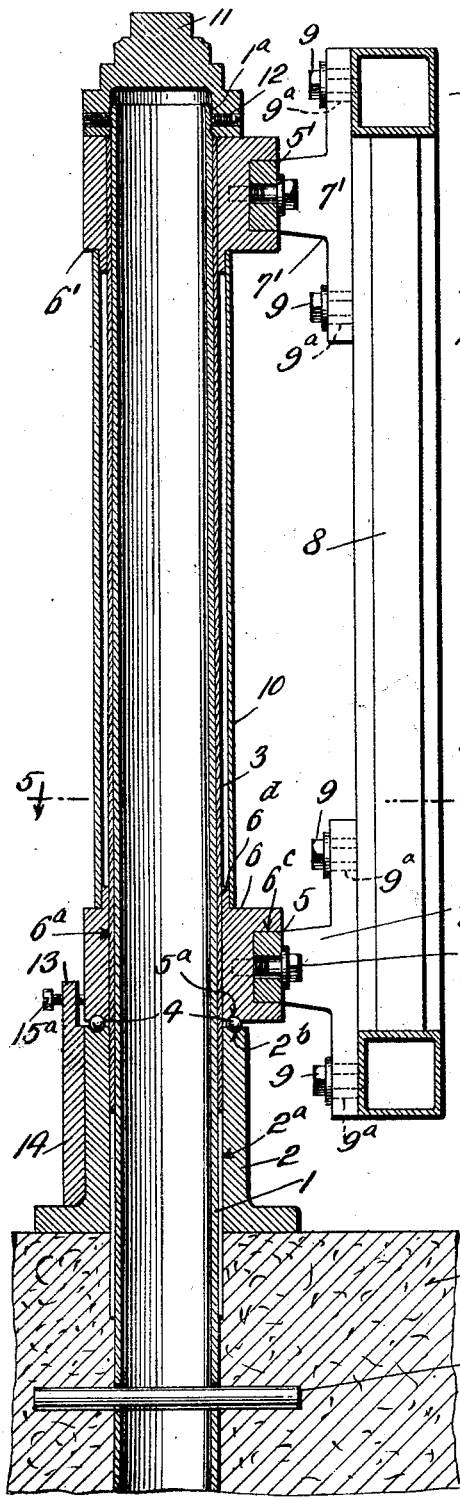
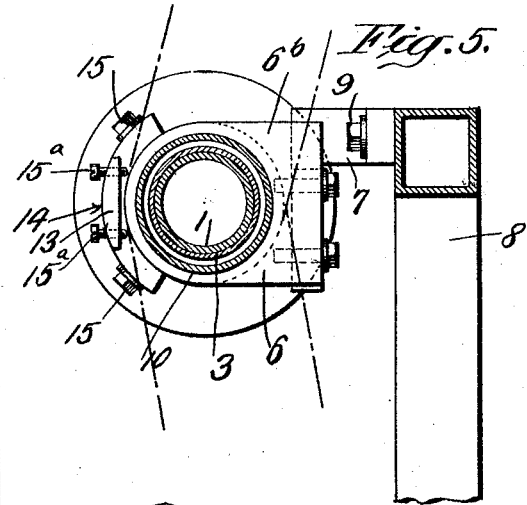
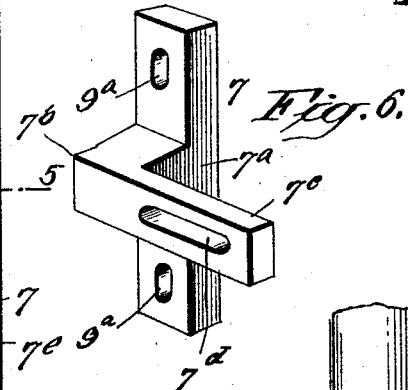
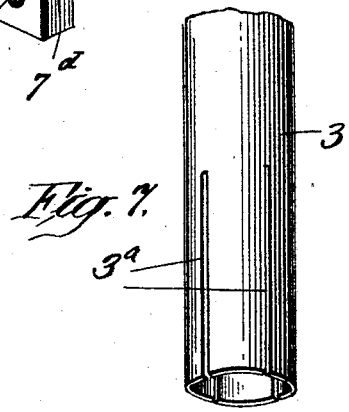
INVENTOR
Henry P. Mertel
BY
Joseph F. O'Brien
His ATTORNEY Patented June 2, 1925.

1,540,490

UNITED STATES PATENT OFFICE.

HENRY P. MERTEL, OF WEST HOBOKEN, NEW JERSEY, ASSIGNOR TO SUMMIT BRASS & BRONZE WORKS, INC., A CORPORATION OF NEW JERSEY.

GATE MOUNTING.

Application filed February 7, 1924. Serial No. 691,117.

*To all whom it may concern:*

Be it known that I, HENRY P. MERTEL, a citizen of the United States, and a resident of West Hoboken, county of Hudson, and State of New Jersey, have invented certain new and useful Improvements in Gate Mountings, of which the following is a specification.

This invention relates to improvements in gate mountings.

One of the objects of this invention is to produce a gate-mounting element which will enable gates of heavy construction, such as used in altar rails, to be readily and quickly mounted and to be supported and swung pivotally with great facility and accuracy of movement.

Another object of this invention is, in a gate-mounting, to provide an adjustable stop device for limiting the pivotal movement of one of the gate hangers to limit the movement of the gate, which adjustable stop will be solid and durable and will be readily adjustable to limit the movement of the gate to varying degrees or arcs of movement.

Another object of my invention is to produce an extremely solid, compact, durable and ornamental gate-mounting.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 4 is a vertical section on the line 4—4 of Fig. 1;

Fig. 5 is a horizontal section on the line 5—5 of Fig. 4;

Fig. 6 is a perspective view of a hanger bracket employed by me; and

Fig. 7 is a perspective view of the lower end of a wedging-tube for fastening a base member and post together.

Figure 1:
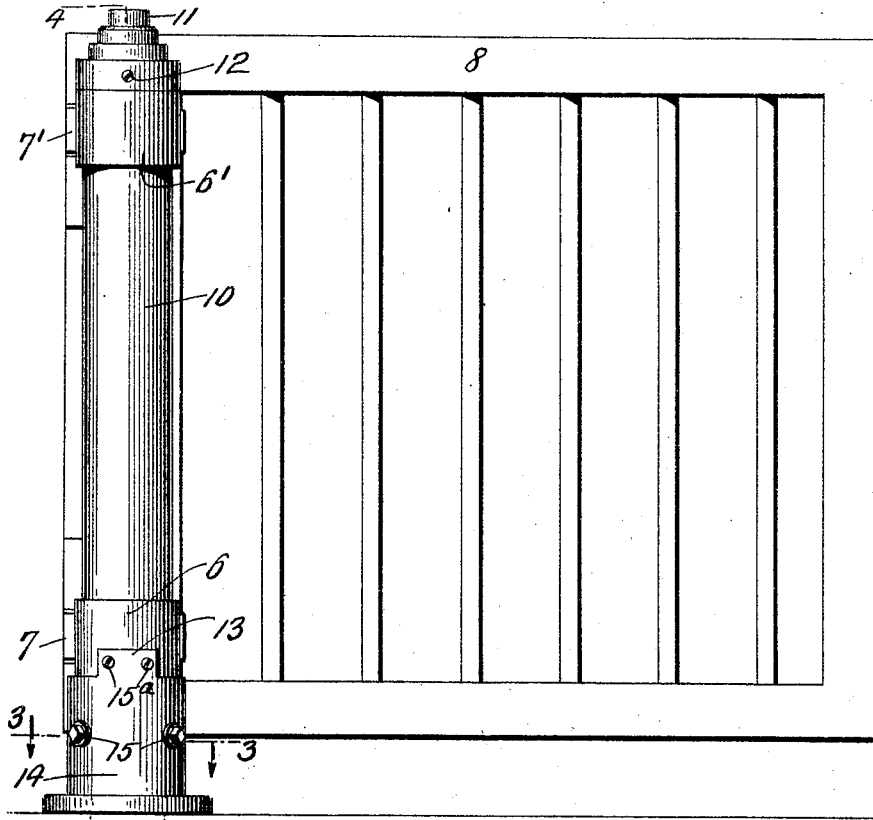
Fig. 1 is a front elevation of a gate-mounting embodying my invention with a gate hung thereon.
Figure 3:
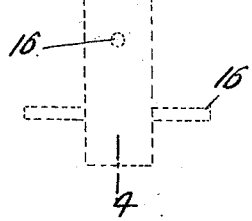
Fig. 3 is a horizontal section on the line 3—3 of Fig. 1.
Figure 3:
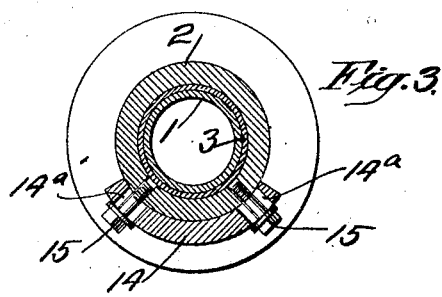
Figure 2:
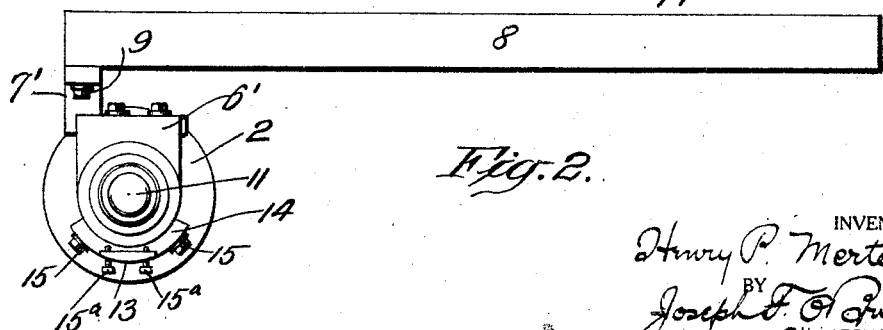
Fig. 2 is a plan view of a mounting and gate shown in Fig. 1.

Referring now to these drawings, which illustrate a preferred embodiment of my invention, 1 indicates an inner anchor-post which preferably comprises an iron or steel pipe of suitable diameter and thickness of metal. Mounted adjacent to the lower end of the anchor-post is a base member 2 which, in the embodiment shown, is fastened to the anchor-post 1 by a combined wedging tube and bearing sleeve 3 which is preferably composed of thin brass or other metal having bearing qualities and fits over the anchor-post 1. The lower end of the sleeve 3 is driven between the anchor-post 1 and the annular or cylindrical bore $2^a$ of the base member 2, so as to securely fasten said base member 2, the anchor-post and said sleeve together. The lower end of the wedging member 3 is preferably split as at $3^a$ to enable this end to contract slightly and hug the anchor-post to permit ready insertion thereof between the bore $2^a$ of the base member 2 and the said anchor-post. Obviously when the sleeve 3 is driven downwardly the diameter thereof will be slightly increased beyond the split portions, and if the bore $2^a$ is of the same or slightly less diameter than the outer periphery of the said sleeve, a tight driving fit may be procured between the base member 2 and the anchoring member 1.

Upper and lower gate-supporting hangers 5—5′ are pivotally mounted on the post, the lower hanger 5 preferably being supported on a ball-bearing 4 formed between the upper annular edge of the base member and the lower edge of said hanger 5. As shown, the base member 2 is provided on its upper annular edge with a circular ball-race or track $2^b$, in which are mounted a series of steel balls 4′, on which balls is mounted the lower supporting hanger 5 which has a registering ball-race or track $5^a$ and an annular bore $6^a$ adapted to fit over and swing pivotally on the sleeve 3. The hanger 5 preferably comprises a pivotally-movable supporting-member 6 and a hanger-bracket 7 adjustable in relation to the pivotal member and to which the gate is attached in any suitable manner. The outer periphery of said pivotally-movable member 6 is preferably annular for a portion of its circumference but has projecting at one side thereof a hanger block $6^b$, the side surfaces of which block preferably extend tangentially from and merge with the annular outer surface of the said member 6. As shown, the gate 8 is connected to the bracket 7 by bolts 9 extending through bolt holes 9ᵃ in a vertical member 7ᵃ to which is connected an L-shaped horizontally-disposed arm 7ᵇ, the leg 7ᶜ of which fits into a channel 6ᶜ in the block 6ᵇ of the pivotal member 6 and is provided with an elongated slot 7ᵈ to enable horizontal adjustment of said bracket on the bolts 7ᵉ in relation to the pivotal member 6, said bolts 7ᵉ taking into said block 6ᵇ of the pivotal member 6.

The pivotal member 6 is also preferably provided with an annular flange 6ᵈ over which, in the embodiment shown, is fitted an outer spacing tube 10 on the upper end of which tube 10 is mounted the upper hanger 5′ which comprises a pivotal member 6′ and a hanger bracket 7′, both of similar conformation to corresponding parts of the lower hanger members hereinabove described, except that the upper member 6′ is not grooved for a ball-bearing. The hanger bracket 7′ and pivotal member 6′ are also fastened together in the same manner as hereinbefore described for the lower hanger.

The upper end of the anchor tube 1 is preferably screw-threaded at 1ᵃ and is provided with a cap 11 which, in the preferred form shown, is locked by means of set screws 12.

Instead of the usual devices which engage the gate, I preferably provide means for limiting the pivotal movement of the hanger to limit the swinging movement of the gate. It is desirable to have the swinging movement of the gate adjustable or variable to accord with conditions in any particular installation and I preferably provide means which may be readily and easily adjusted to vary the swinging movement of the gate.

In the preferred embodiment illustrated, I mount within the path of movement of the projecting hanger block of the pivoted hanger member 6 an abutment element 13 which, in the embodiment shown, is mounted on a mounting portion 14 secured to the base 2 by bolts 15. The mounting portion 14 has elongated bores 14ᵃ which permit adjusting movement of the mounting member 14 in relation to the base member 2. Obviously, when the hanger member 6 is swung pivotally on the post the projecting tangential side walls of the block 6ᵇ would normally contact with the abutment 13 and the movement of said member 6 and the gate attached thereto would be limited by contact with such abutment. I prefer, however, to space the abutment from the pivotal hanger member 6 and to provide said abutment at opposite sides with screws 15ᵃ by the inward and outward adjustment of which the pivotal movement of the hanger member 6 and gate may be further and more accurately adjusted. Thus by screwing the screw 15ᵃ at one side into close proximity with the periphery of the pivotal member 6 the end of the screw will come into contact with the projecting tangential side wall of the bearing block 6ᵇ at a less remote place than if the screw be turned outwardly and further away from the periphery of said pivotal hanger member. This is well shown by the dotted lines in Fig. 5.

The anchor post 1 is preferably provided at its lower end with transverse anchor bars 16 for the purpose of enabling a secure anchoring of the lower end of said anchor post in a bed of cement 17 or the like.

Having described my invention, I claim:—

1. A gate-mounting embodying, in combination, an inner anchor member, a base member loosely fitting over said anchor member and a sleeve fitting over said anchor member and within the base member for connecting said anchor member and base member together, and gate-hanger members mounted on said gate-mounting.

2. A gate-mounting embodying, in combination, an inner anchor member, a base member loosely fitting over said anchor member and a sleeve having a split lower end fitting over said anchor member and within the base member for connecting said anchor member and base member together, and gate-hanger members mounted on said gate-mounting.

3. A gate-mounting embodying, in combination, an inner anchor member, a base member fitting over said anchor member, a sleeve for connecting said anchor and base members together, a lower gate hanger mounted on said base member, a tubular member mounted on said lower hanger and an upper hanger mounted on said tubular member.

4. A gate-mounting embodying, in combination, an anchor post, a base member fitting over said anchor post, a sleeve having a split lower end fitting over said anchor member and within the base member for connecting said anchor and base members together, a lower gate hanger pivotally supported on said post, a ball-bearing between said lower hanger and base member, and an upper gate hanger also pivotally supported on said post.

5. A gate-mounting embodying, in combination, an anchor post, a base member fitting over said anchor post, a sleeve having a split lower end fitting over said anchor member and within the base member for connecting said anchor and base members together, a lower gate hanger pivotally supported on said post, a tubular member mounted on said lower hanger and an upper hanger mounted on said tubular member, the lower edge of the lower hanger being provided with a ball-bearing track, the upper edge of the base member being provided with a registering track and balls arranged between such tracks.

6. A gate-mounting embodying, in combination, an anchor post, a base member fitting over said anchor post and connected thereto, and hangers pivotally mounted on said post and supported on said base member comprising pivotally swinging members and bracket members adjustable in relation to such swinging members.

7. A gate-mounting embodying, in combination, an anchor post, a base member fitting over said anchor post, a sleeve having a split lower end fitting over said anchor member and within the base member for connecting said anchor and base members together, hangers mounted on said mounting comprising pivotally swinging members provided with an annular bore and having a bearing block projecting from one portion of its periphery, said block having a bracket-channel and bracket adjustably mounted within said channel.

8. A gate-mounting embodying, in combination, an inner anchor post, a base member fitting over said anchor member, a sleeve having a split lower end fitting over said anchor member and within the base member for connecting said anchor and base members together, hanger members comprising a pivotal member pivotally mounted on said sleeve and having an annular-bearing bore and a partial annular outer surface and a projecting bearing block, and a movement limiting abutment mounted in the path of said bearing block.

9. A gate-mounting embodying, in combination, an inner anchor post, a base member fitting over said anchor member, a sleeve having a split lower end fitting over said anchor member and within the base member for connecting said anchor and base members together, hanger members comprising a pivotal member pivotally mounted on said sleeve and having an annular-bearing bore and a partial annular outer surface for a major portion of its periphery and a projecting bearing block at one portion connected with the annular surface by a tangential surface and a movement limiting abutment mounted in the path of said bearing block.

10. A gate-mounting embodying in combination, an inner anchor post, a base member fitting over said anchor member, a sleeve having a split lower end fitting over said anchor member and within the base member for connecting said anchor and base members together, hanger members comprising a pivotal member pivotally mounted on said sleeve and having an annular-bearing bore and a partial annular outer surface, and a projecting bearing block, and a movement-limiting abutment in the path of said bearing block and having screws adjustable to cause abutment against the tangential wall of said block at varying points in the pivotal movement thereof.

11. A gate-mounting embodying, in combination, an anchor post, an inner anchoring member, a base member fitting over said anchor member, a sleeve having a split lower end fitting over said anchor member and within the base member for connecting said base and anchor member together, hanger members comprising a pivotal member pivotally mounted on said sleeve and having an annular bearing bore, a partial annular surface extending over a major portion thereof, a bearing block at one portion connected with the partial annular surface by a surface tangential thereto, and a movement-limiting abutment in the path of said bearing block and having screws adjustable to cause abutment against the tangential wall of said block at varying points in the pivotal movement thereof.

In witness whereof, I have signed my name to the foregoing specification in the presence of two subscribing witnesses.

HENRY P. MERTEL.

Witnesses:
ABRAM C. SAFYER,
FRED HANSMANN.